United States Patent
Komura et al.

(10) Patent No.: US 6,771,459 B1
(45) Date of Patent: Aug. 3, 2004

(54) SPINDLE MOTOR AND HARD DISC DRIVE INCORPORATING THE SAME

(75) Inventors: Osamu Komura, Itami (JP); Makoto Otsuki, Itami (JP); Kaoru Murabe, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/561,341

(22) Filed: Apr. 28, 2000

(30) Foreign Application Priority Data

Apr. 30, 1999 (JP) ............................................ 11-124205

(51) Int. Cl.[7] ............................................. G11B 17/02
(52) U.S. Cl. ................................................... 360/99.08
(58) Field of Search ........................ 360/99.08; 384/112, 384/107, 114

(56) References Cited

U.S. PATENT DOCUMENTS

| | | | | |
|---|---|---|---|---|
| 4,007,973 A | * | 2/1977 | Collins et al. ............... | 384/117 |
| 4,301,487 A | * | 11/1981 | Maruyama ............. | 360/130.24 |
| 4,487,514 A | * | 12/1984 | Mori .......................... | 384/113 |
| 4,490,759 A | * | 12/1984 | Maruyama ............... | 360/271.3 |
| 4,656,545 A | * | 4/1987 | Kakuta ..................... | 360/98.07 |
| 5,127,744 A | * | 7/1992 | White et al. ................ | 384/112 |
| 5,142,173 A | * | 8/1992 | Konno et al. ............ | 360/98.07 |
| 5,280,208 A | * | 1/1994 | Komura et al. ............... | 310/90 |
| 5,344,577 A | * | 9/1994 | Deckman et al. .......... | 508/569 |
| 5,366,298 A | * | 11/1994 | Toshimitsu et al. ......... | 384/107 |
| 5,485,331 A | * | 1/1996 | Dunfield et al. ......... | 360/99.08 |
| 5,675,201 A | * | 10/1997 | Komura et al. ............ | 310/90.5 |
| 5,718,516 A | * | 2/1998 | Cheever ..................... | 384/114 |
| 5,729,404 A | | 3/1998 | Dunfield et al. | |
| 5,969,448 A | * | 10/1999 | Liu et al. ..................... | 310/90 |

FOREIGN PATENT DOCUMENTS

| | | | |
|---|---|---|---|
| EP | 0 410 293 | 1/1991 | |
| EP | 0 581 278 | 2/1994 | |
| EP | 0 633 406 | 11/1995 | |
| EP | 0 684 497 | 11/1995 | |
| JP | 62262237 | 11/1987 | |
| JP | 11159524 A | * 6/1999 | ........... F16C/17/00 |

OTHER PUBLICATIONS

Ashby et al. "Materials Selection in Mechanical Design", Troisième Conférence Européenne sur les Matériaux et les Procèdes Avances, Europium '93, Paris, Jeune 8–10, 1993, pp. 1–9.* http://www.bearingsworld.com, "Ceramic Bearings", Fundamental property data of ceramic and steel materials, pp. 1–4.*

* cited by examiner

Primary Examiner—George J. Letscher
Assistant Examiner—Christopher R Magee
(74) Attorney, Agent, or Firm—McDermott Will & Emery LLP

(57) ABSTRACT

A spindle motor includes a fixed base member, an outer cylindrical member made from a hollow tube, and an inner cylindrical member inserted in said outer cylindrical member. The inner and outer cylindrical members are arranged so that one of the outer and inner cylindrical member is fixed to the base member and the other is rotatable about a longitudinal axis thereof. A bearing assembly is provided for bearing the rotatable cylindrical member on the fixed cylindrical member. Also, drive means is provided for rotating the rotatable cylindrical member about the fixed cylindrical member. In particular, the fixed cylindrical member is made of ceramic.

4 Claims, 5 Drawing Sheets

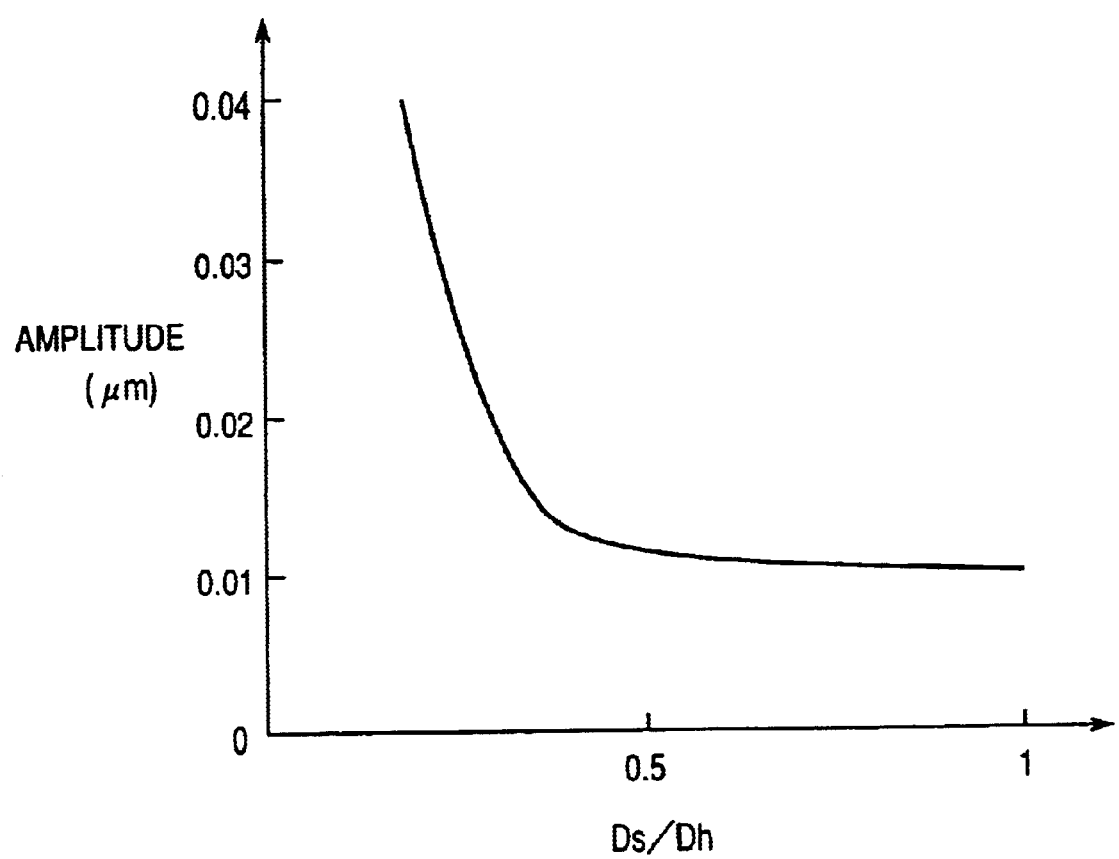

SPINDLE MOTOR AND HARD DISC DRIVE INCORPORATING THE SAME

FIELD OF THE INVENTION

The present invention relates to a spindle motor for use with a small sized memory device such as hard disc drive. Also, the present invention relates to a hard disc drive incorporating the spindle motor therein.

BACKGROUND OF THE INVENTION

Typically, the small sized memory device such as hard disc drive has been required to have a large storage capacity and to allow a quick read and write operation from and into hard discs mounted in the hard disc drive. This in turn requires drive means or spindle motor in the memory device to be small, light, and highly reliable. For such requirements, the spindle motor should be designed so that, even if small sized, it can rotate the increased number of hard discs in an increased rotational frequency with a desired precision.

FIG. 1 shows an example of conventional spindle motors. The spindle motor includes a housing 1 or fixed base. A vertical shaft 2 is fixedly connected at one end thereof to the housing 1. A ball bearing 3, which is provided around the shaft 2, carries a rotor hub 4 for rotation around the shaft 2. A plurality of storage medium or hard discs 6 are supported around the rotor hub 4 in a coaxial fashion so that each of the hard discs 6 extends perpendicular to the shaft 2 and spaces a certain gap away from the neighboring hard disc or discs. A plurality of stators 7, each of which bears a coil wound therearound, are arranged at regular intervals along an outer periphery of a cylindrical portion formed in the housing 1 in a coaxial fashion with the shaft 2. On the other hand, a plurality of magnets 9 are arranged at regular intervals along an inner periphery of a cylindrical portion formed in the rotor hub 4, surrounding around the outer periphery and leaving a certain gap therebetween, so that the magnets. 9 confront to the stators 7.

In operation of the spindle motor so constructed, a certain alternating current is applied to the coils 8 to form an alternating magnetic field therearound, causing the rotor hub 4 and hard discs 6 supported thereby to rotate in a predetermined direction through the bearing 3 around the shaft 2. Although not shown, in order to read and write information from and into the hard discs, a plurality of access arms are positioned corresponding to respective hard discs. Each access arm carries a read and write head or magnetic head for reading information from the corresponding hard disc and writing information onto the same.

As described above, the hard disc drive is required not only to be small but also to read and write information in an increased rate. To this end, the hard disc drive should be provided with some improvements and modifications. Specifically, the shaft 2 of the hard disc drive shown in FIG. 1, supported only at its one end, has a typical outer diameter of about 6 mm and is made of stainless steel. Disadvantageously, the number of hard discs supported by such shaft 2 is limited to six because, if supporting more number of hard discs on the shaft, the shaft would cause greater vibrations due to an insufficient rigidity of the shaft, which results in another defect in read and write operations for the hard discs 6.

Contrary to this, the market requires the hard disc drive to have further storage capacity. In response to the requirement, ten or more hard discs should be mounted on the rotor hub. For the purpose, there have been proposed several techniques in the art. One technique is to increase the diameter of the shaft 2, and another is to support the shaft at its opposite ends, thereby reducing the vibrations of the shaft.

FIG. 2 shows another hard disc drive employing the latter technique in which the shaft is supported at its opposite ends. In this hard disc drive, the shaft 10 is formed at its top end portion with a threaded hole 11 extending along a longitudinal axis of the shaft 10. Also, the top end of the shaft 10 is connected with a hard disc cover 13 fixed on a base not shown. The connection between the shaft 2 and the hard disc cover 13 is performed with a screw bolt 14 which is inserted through a through hole 15 formed in the hard disc cover 13 and then screwed into the threaded hole 11 of the shaft 10. The shaft 10, so supported at its opposite ends and thereby provided with the increased rigidity, can support more hard discs, e.g., ten hard discs, and rotate them without any vibrations that would provide adverse affects for read and write operations.

Disadvantageously, the proposed two techniques have respective drawbacks that should be solved. For example, the former technique in which the diameter of the shaft is increased results in an increase of weight of the hard disc drive, deteriorating the compactness of the hard disc drive. The latter technique on the other hand requires additional processes for the formations of the holes 11 and 15. Also, the threaded hole 11 and the through hole 15 should be formed so that, when the hard disc cover 13 is assembled on the base, they position in a coaxial fashion, which needs a great precision for the machining of both holes.

Another technique has been employed for the spindle motor in order to meet the requirement of compactness thereof, in which a gas-lubricated or oil-lubricated hydrodynamic bearing is used for the bearing assembly in the spindle motor. Among these the oil-lubricated hydrodynamic bearing has a drawback that an increased rotational movement causes a high temperature in the bearing assembly due to the viscosity of the oil. This problem may be solved simply by decreasing the diameter and then the peripheral speed of the shaft, which in turn results in the above-mentioned problem caused by the reduced diameter of the shaft.

SUMMARY OF THE INVENTION

Therefore, an object of the present invention is to solve the above-mentioned problems of the conventional spindle motor. Another object of the present invention is to provide an improved spindle motor allowing a small sized hard disc drive to have an enlarged storage capacity. Another object of the present invention is to provide an improved spindle motor allowing the shaft to, rotate in a high speed in the hydrodynamic bearing assembly. Another object of the present invention is to provide an improved hard disc drive incorporating such spindle motor.

Accordingly, a spindle motor of the present invention includes a fixed base member, an outer cylindrical member made from a hollow tube, and an inner cylindrical member inserted in the outer cylindrical member. The inner and outer cylindrical members are arranged so that one of the outer and inner cylindrical member is fixed to the base member and the other is rotatable about a longitudinal axis thereof. A bearing assembly is provided for bearing the rotatable cylindrical member on the fixed cylindrical member. Also, drive means is provided for rotating the rotatable cylindrical member about the fixed Cylindrical member. In particular, the fixed cylindrical member is made of ceramic.

BRIEF DESCRIPTION OF THE DRAWINGS

FIG. 6 is a graph showing a relationship between a diameter ratio of rotor hub and shaft and the vibration of the shaft;

DETAILED DESCRIPTION OF THE PREFERRED EMBODIMENTS

Figure 1:
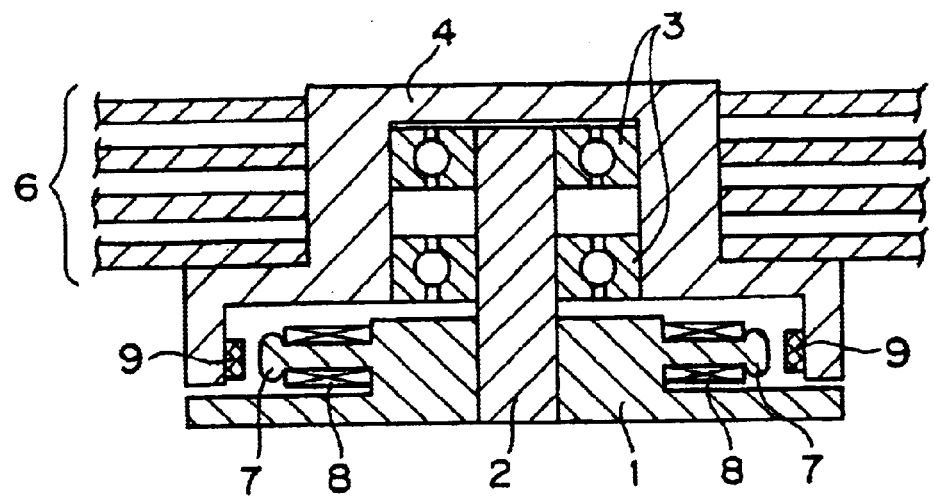
FIG. 1 is a cross sectional view of a conventional spindle motor in which a shaft is supported at its one end.
Figure 2:
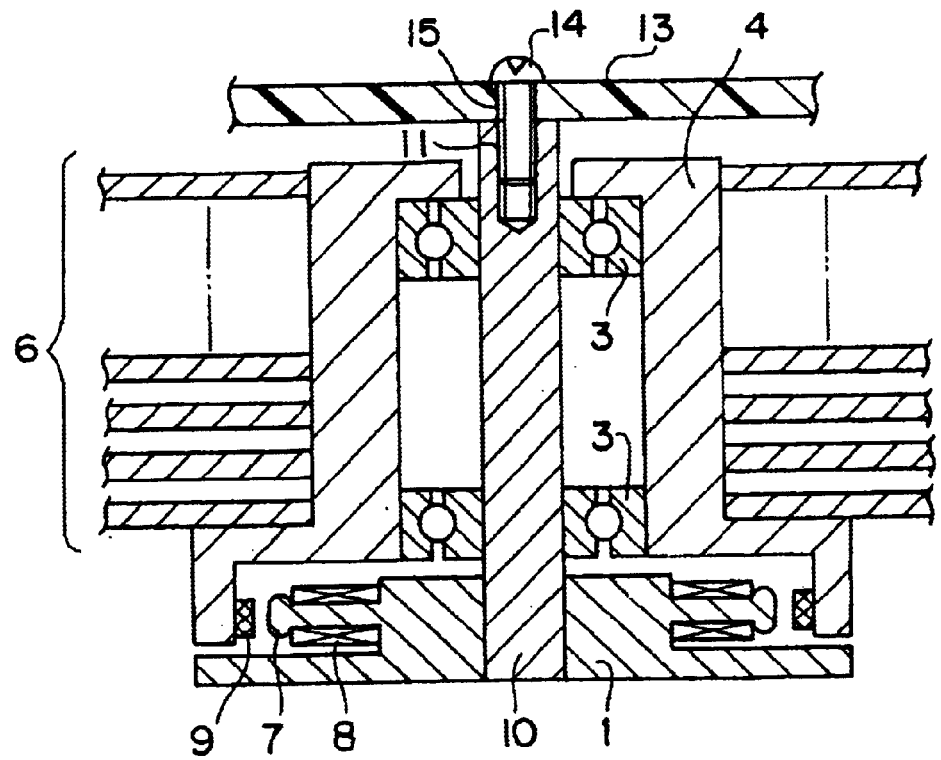
FIG. 2 is a cross sectional view of another conventional spindle motor in which a shaft is supported at its opposite ends.
Figure 3:
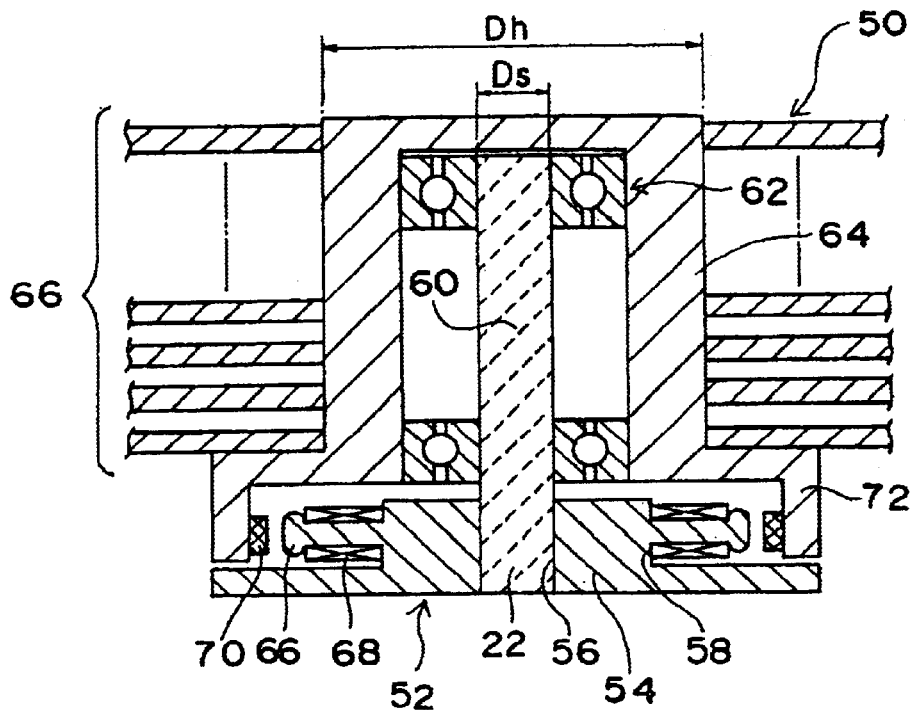
FIG. 3 is a cross sectional view of a spindle motor according to the first embodiment of the present invention.

With referring to the drawings, in particular in FIG. 3, there is shown a part of a hard disc drive, generally indicated by reference numeral 50 according to the first embodiment of the present invention. The hard disc drive includes a spindle motor generally indicated by reference numeral 52 according to the first embodiment of the present invention. The spindle motor 52 includes a base member 54 secured on a substrate (not shown) of the hard disc drive 50. The base member 54 has a through hole 56 and a cylindrical portion 58 or periphery, arranged in a coaxial fashion. A vertical shaft 60 or rod is inserted into the through hole 56 of the base member 54 and thereby fixed at its base 22 to the base member 54. Preferably, the shaft 60 is made of ceramic, in particular alumina based ceramic. Also preferably, the shaft 60 has a Young's modulus (GPa) of about from 300 to 400, which is twice as that of steel.

A bearing assembly 62 is provided around the shaft 60 for bearing a rotor hub 64 for rotation around the shaft 60. In this embodiment, the bearing assembly 62 includes a ball bearing or groove bearing. A plurality of hard discs 66 or information storage media are supported around the rotor hub 64 in a coaxial fashion so that each of the hard discs 66 extends perpendicular to the shaft 60 and spaces a certain gap away from the neighboring hard disc or discs.

For driving the rotor 64, a plurality of stators 66 each bearing coils 68 wound therearound are arranged at regular intervals along the cylindrical portion 58 or periphery of the base member 54 in a coaxial fashion with the shaft 60. On the other hand, a plurality of magnets 70 are arranged at regular intervals around the stators 66. For supporting the magnets 70, the rotor 64 has a cylindrical portion 72 extending around the cylindrical portion 58 of the base member 58, leaving a certain gap therebetween.

In operation of the spindle motor so constructed, a certain alternating current is applied to the coils 68 to form an alternating magnetic field therearound, causing the magnets 70, the rotor hub 64, and hard discs 66 to rotate in a predetermined direction through the bearing 62 around the shaft 60. Also, as necessary, information stored in the rotating hard discs is retrieved by a read and write magnetic head (not shown) and another information is recorded in the rotating hard disc by the read and write head magnetic head, as is known in the art.

With the arrangement, the shaft 60 made of ceramic having a greater rigidity than the steel can support a number of hard discs. For example, the shaft having a diameter of 6 mm can support and then rotate ten hard discs without any vibrations which would provide adverse affect on the read and write operations.

Figure 5A:
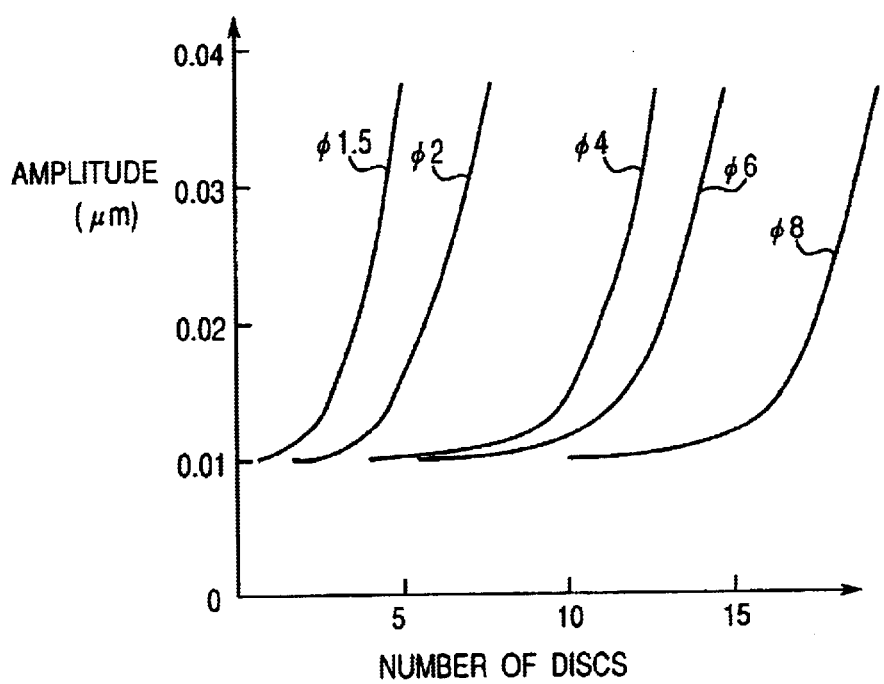
FIGS. 5A and 5B are graphs, each of which showing a relationship between the vibration of the shaft and the number of hard discs supported by the shaft.
Figure 5B:
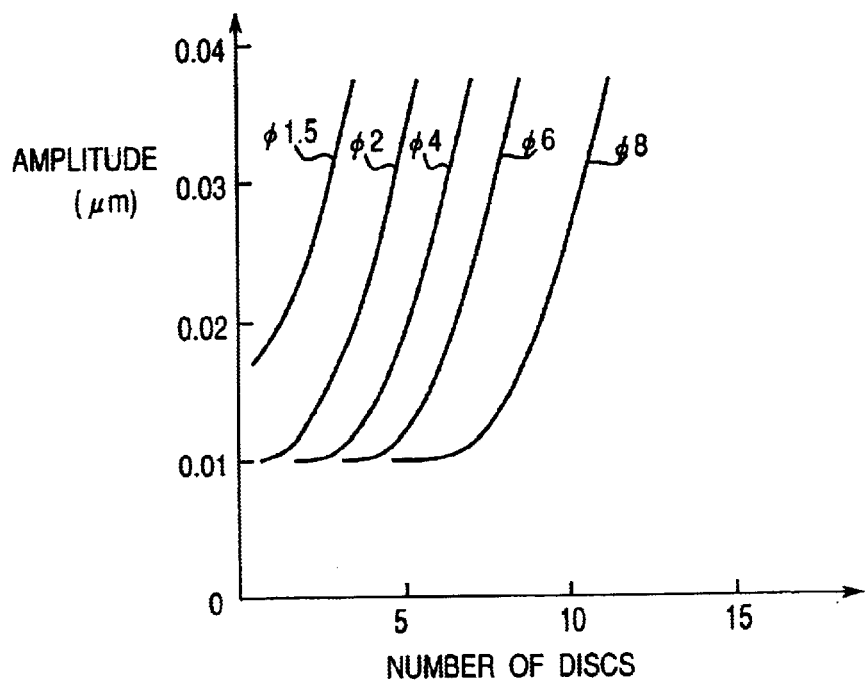

The number of hard discs to be supported and rotated without causing such vibrations depends upon conditions in which the hard disc drive is used and reliability required for the read and write operation. Then, tests were made to obtain a relationship between the number of hard discs supported on the rotor and vibrations, i.e., amplitude of the shaft, for two types of shafts made of ceramic and stainless steel. The result is indicated as graphs in FIGS. 5A and 5B.

As can be seen from the graphs, when the allowable amplitude of the shaft is set 0.012 μm, for the ceramic shaft the shafts having diameters of 1.5 mm, 4 mm, 6 mm, and 8 mm can support 1–2, 4–8, 6–10, and 8–15 hard discs, respectively. On the other hand, for the stainless steel shaft the shaft having diameters of 2 mm, 4 mm, 6 mm, and 8 mm can only support 1, 2–3, 3–4, 4–7 hard discs, respectively, which are considerably smaller than those for ceramic shaft.

When using a solid rod for the shaft supported at one end thereof, the ceramic rod having a diameter of 1 mm or more can be applicable for the spindle motor. However, from a practical point of view, the ceramic rod should carry at least four hard discs and therefore have a diameter of 2 mm or more. For a shaft having an outer diameter of 10 mm, a hollow cylindrical ceramic tube is preferably used for reducing the total weight of the motor and the hard disc drive. Also preferably, when using solid rod for the shaft, it has a diameter of about 2–10 mm for bearing the rotor with four or more hard discs.

Figure 4:
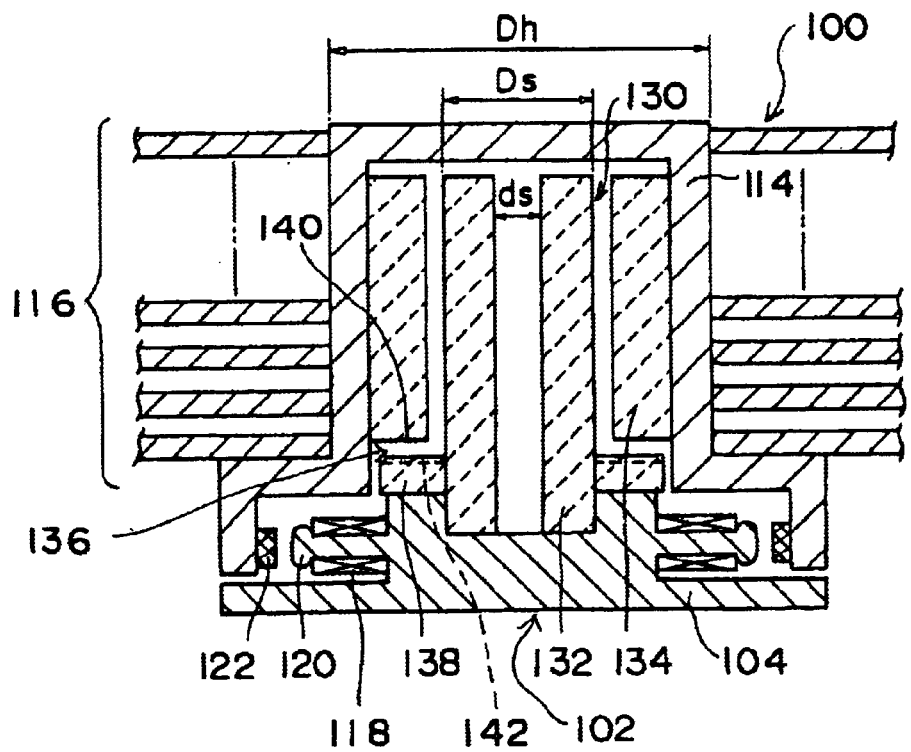
FIG. 4 is a cross sectional view of a spindle motor according to the second embodiment of the present invention.

Referring to FIG. 4, there is shown a part of another hard disc drive generally indicated by reference numeral 100 according to the second embodiment of the present invention. The hard disc drive 100 includes a spindle motor generally indicated by reference numeral 102 according to the second embodiment of the present invention. The spindle motor 102 of this embodiment is different from the spindle motor 52 in which the spindle motor 102 employs a different type of bearing assembly from that used in the spindle motor 52. Specifically, although the bearing assembly 62 in the spindle motor 52 comprises the ball bearing, a bearing assembly of the spindle motor 102 has a hydrodynamic bearing. The hydrodynamic bearing may be classified into two groups, gas-lubricated, hydrodynamic bearing and oil-lubricated hydrodynamic bearing, both of which being applicable to the present invention.

As shown in FIG. 4, the spindle motor 102 using the hydrodynamic bearing generally indicated by reference numeral 130 employs a hollow cylindrical shaft 132 or tube, having an inside diameter ds, made of ceramic. The shaft 132 is secured at its bottom end to the base member 104. A sleeve 134 or hollow is cylindrical tube having a greater diameter than the outer diameter of the shaft 132 is fixedly inserted in the rotor hub 114 and then mounted around the shaft 132 so that it can rotate around the shaft 132 with the rotor hub 114. The shaft 132 and sleeve 134 defines a cylindrical bearing chamber therebetween for the hydrodynamic bearing 130 with respect to the radial direction.

For bearing of the sleeve 134 and the rotor hub 114 on the base member 104, a hydrodynamic thrust bearing or axial bearing generally indicated by reference numeral 136 is provided. The thrust bearing 136 is defined by a pair of opposing surfaces, i.e., a thrust plate 138 fixed on the base member 104 and a bottom end surface 140 of the shaft 134. The thrust plate 138 is made from a ring plate mounted around the shaft 132. Also, the thrust plate 138 is formed at its one surface facing to the bottom end surface 140 of the shaft 132 with a plurality of spaced grooves.142 each extending radially.

In operation of the hard disc drive 100 so constructed, a certain alternating current is applied to the coils 118 each wound around the stators 120 to form an alternating magnetic field therearound. This causes the magnets 122, the rotor hub 114, and hard discs 116 to rotate in a predetermined direction through the radial and axial bearings, 130 and 136, around the shaft 132. As the rotational speed of the shaft 132 are increased, the hydrodynamic pressures (i.e., hydrodynamic radial and thrust pressures) between the opposing peripheries of the shaft 132 and the sleeve 134 and also between the bottom end surface 140 of the shaft 132 and the opposing thrust plate 138 are increased. Then, when the rotational speed has increased to certain extents, the sleeve 134 becomes to lose frictional contacts with the shaft 132 and thrust plate 138, respectively, rendering the rotation of the sleeve 134 and the rotor hub 114 into a steady state.

The outer periphery of the shaft 132 may be formed with grooves, such as herringbone grooves, helical grooves, and vertical grooves in order to increase the hydrodynamic radial pressure generated in the bearing chamber between the shaft 132 and the sleeve 134.

The sleeve 134 and thrust plate 138 may be made of hardened stainless steel. However, as described above, the sleeve 134 maintains frictional contacts with the sleeve 134 and thrust plate 138 before the formation of sufficient pressures therebetween, causing wear of the shaft 132, sleeve 134, and thrust plate 138. This deteriorates the durabilities of the contacting members. Therefore, in order to decrease the frictional wear of such members and increase the durability thereof,-the sleeve 134 and thrust bearing 138 are also preferably made of ceramic material.

Normally, in the oil-lubricated hydrodynamic bearing, the rotational speed of the rotor hub is limited to a certain extent due to the viscosity of the oil, which will be described below; however, the gas-lubricated hydrodynamic bearing employed in the present invention is free from such problem, allowing the diameter of the shaft of the spindle motor to be increased.

Also, the hollow cylindrical shaft contributes not only to decrease the weight of the shaft but also to increase the rigidity of the shaft. Of course, the same effect can also be attained for the hollow cylindrical shaft made of steel. However, the hollow cylindrical steel shaft should have a certain thickness in order to achieve a necessary rigidity and the weight is proportion to the square of diameter, which is considerably disadvantageous compared to the ceramic shaft.

Specifically, alumina based ceramic has a specific gravity of 3.9 that is about half of steel and also has a certain rigidity that is two times greater than that of steel. This means that the hollow cylindrical ceramic shaft can have a necessary rigidity even if the thickness thereof is reduced to about 2 mm (i.e., difference of inner and outer diameters is 4 mm). Besides, there has already been provided a technique that can produce such thinned hollow ceramic cylinder. In addition, steel has a greater specific gravity than ceramic and, in addition, the steel shaft is required to have greater thickness or greater diameter than that made of ceramic, increasing the weight of the assembly.

Tests made by the inventors showed that ceramic shaft having a diameter of 6 mm or more could be prepared. Also, hollow cylindrical ceramic shafts each having a thickness of 2 mm were prepared and tested how many hard discs can be carried on the rotor hub without generating an excessive vibration of the shafts. As a result, it was found that the hollow cylindrical shafts having respective outer diameters of 6 mm, 10 mm, 15 mm, and 20 mm can carry 4–8, 6–12, 8–15, and 10–20 hard discs.

Also, the tests showed that the hollow cylindrical ceramic shaft with an outer diameter of about 6 mm and an inner diameter of about 2 mm can be used for the shaft of hard disc drive. Further, it is understood that the hollow cylindrical ceramic shaft having an outer diameter of up to 20 mm can be used for the hard disc drive. The thickness of the hollow cylindrical shaft should be 2 mm or more when considering the machining and the required rigidity thereof. Therefore, preferably the hollow cylindrical shaft only supported at its one end in the hard disc drive has an outer diameter of about 6 to 20 mm and a thickness of 2 mm or more.

The vibration of the shaft generated at the rotation of the rotor hub depends upon a ratio (r) of the outer diameter (Ds) of the shaft to the outer diameter (Dh) of the rotor hub, i.e., r=Ds/Dh. That is, as the ratio increases, the rigidity of the shaft increases and thereby decreases the vibration of the shaft. With tests made by the inventors, it is found that the ratio of 0.4 or more reduces the vibrations considerably, which is shown in FIG. 6. In tests, the spindle motor was designed so that Dh was 25 mm, longitudinal length of the bearing was 15 mm, and the number of hard discs supported on the rotor hub was 16. Also, the vibration, i.e., maximum amplitude of the shaft, was measured at the rotational number of 18,000 rpm.

It should be noted that in the above embodiment both of radial and thrust bearings use. gas-lubricated bearings; however, any one of which may be replaced by another type of bearing such as magnetic bearing.

Next, descriptions will be made to a third embodiments of the spindle motor and the hard disc drive. The spindle motor of this embodiment is featured in that the sleeve is fixed to the base member and the shaft is rotatably supported within the sleeve through a hydrodynamic bearing defined therebetween. As described above, in particular when the shaft is rotated in a high speed relative to the sleeve, the oil-lubricated hydrodynamic bearing tends to heat the lubricant or oil to an elevated temperature due to the viscosity of the oil. This in turn deteriorates the lubrication and the performance of the motor. Contrary to this, the ceramic rod with a higher rigidity and a smaller diameter can be used for the bearing shaft. This allows a peripheral speed of the shaft to be increased and, in turn, the hydrodynamic bearing to be employed for the bearing assembly in the spindle motor.

Conventionally, it has been understood that the diameter of the shaft used in the oil-lubricated hydrodynamic bearing assembly should be limited 6 mm or less due to the excessive heating of the oil. Then, for the steel shaft the maximum number of hard discs to be supported by the shaft is limited to four; however, for the ceramic shaft it can be increased up to about ten, which increases the storage capacity of the hard disc drive dramatically.

Figure 7:
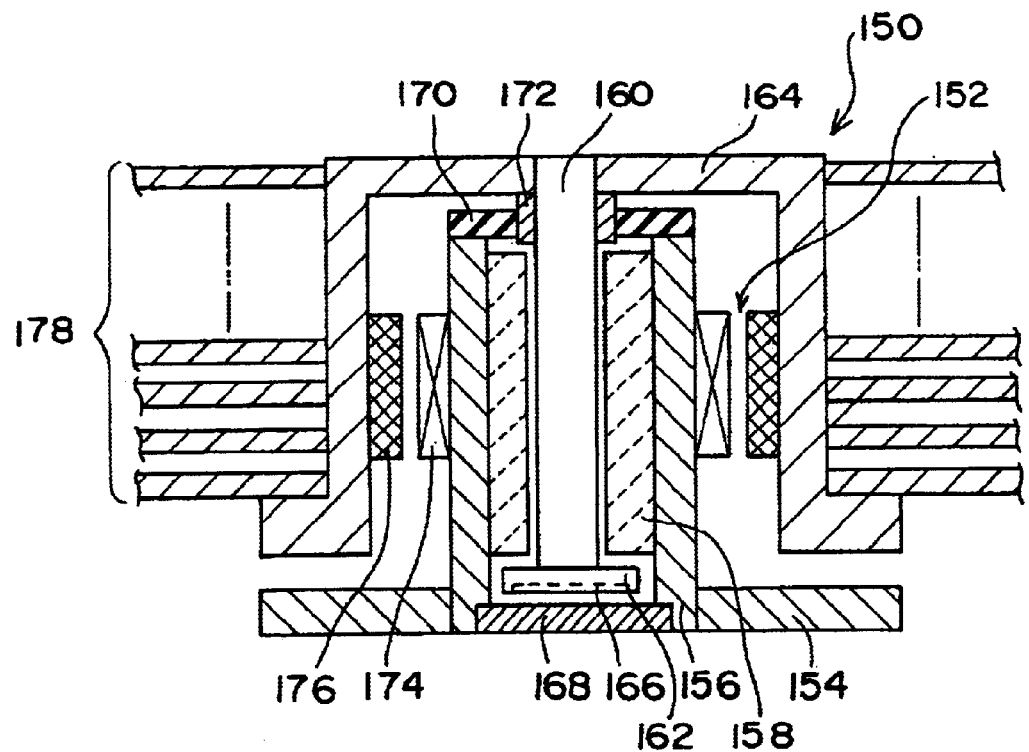
FIG. 7 is a cross sectional view of a spindle motor according to the third embodiment of the present invention.

Referring to FIG. 7, there is shown a part of the hard disc drive generally indicated by reference numeral 150 according to the third embodiment of the present invention. The hard disc drive 150 includes a spindle motor generally indicated by reference numeral 152 according to the second embodiment of the present invention. The spindle motor 152 has a base plate 154 fixed on a substrate not shown. A hollow cylindrical member or support 156, preferably made of ceramic, is fixed at its one end to the base plate 154 so that it extends vertically from the base plate 154. Another cylindrical member or sleeve 158 is inserted and then fixed in the cylindrical support 156. A shaft 160, preferably made of ceramic, is inserted in the sleeve 158 so that it can rotate around its longitudinal axis. The shaft 160 has bottom and top end portions extended out from corresponding end portions of the sleeve 158. The bottom end portion of the shaft 160 holds a thrust plate 162 in the form of disc in a coaxial fashion and the top end portion of the shaft 160 holds a rotor hub 164. The thrust plate 162 is formed at its bottom surface away from the shaft 160 with a plurality of grooves 166 each extending radially. Another thrust plate 168 is provided below the thrust plate 162 and fixed, for example, at the bottom end of the sleeve 156. Preferably, the thrust plates 162 and 168 are made of ceramic.

In this arrangement, the sleeve 158 and shaft 160 opposing to each other in the radial direction form a hydrodynamic bearing, i.e., radial bearing. Also, the thrust plates 162 and 168 opposing to each other in the axial direction form another hydrodynamic bearing, i.e., axial bearing. Bearing chambers defined in the radial and thrust bearings are filled with a suitable lubricant, for example, oil for the radial and axial bearings.

In order to prevent a possible leakage of the oil from the bearing chamber, a top opening of the bearing chamber is closed by an outer seal ring 170 and an inner seal ring 172 surrounding around the shaft 160 while leaving a small gap therebetween.

In addition, the sleeve 158 holds a number of stator and coil members 174 at its outer periphery. The rotor hub 164 holds a number of magnets 176 around the stator and coil members 174, leaving a certain gap therearound. Also, the rotor hub 164 carries a plurality of hard discs 178 in a coaxial fashion.

In operation, a certain alternating current is applied to the coils to form an alternating magnetic field between the stator and coil members 174 and magnets 176. This causes the shaft 160, the rotor hub 164, and hard discs 178 to rotate in a predetermined direction through the radial and axial bearings around the shaft 160. As the rotational speed of the shaft 160 increases, the hydrodynamic pressures (i.e., hydrodynamic radial and thrust pressures) between the opposing peripheries of the shaft 160 and the sleeve 158 and also between the thrust plates 162 and 168 increase. Then, the rotating shaft 160 and thrust plate 162 begins to lose frictional contacts with the sleeve 158 and thrust plate 168, respectively, rendering the rotation of the shaft 160 and the rotor hub 164 into a steady state.

As described above, the oil filled in the hydrodynamic bearing assembly should be kept at lower temperature. In this embodiment, this can easily be attained by using a rod with a reduced diameter and thereby reducing the peripheral speed of the shaft 160.

Figure 8:
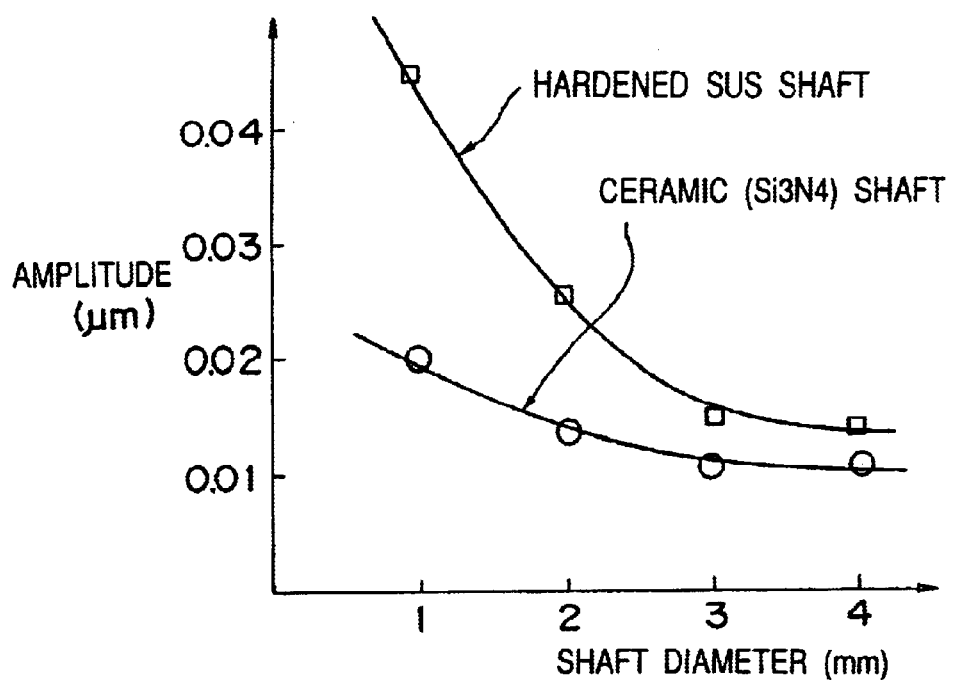
FIG. 8 is a graph showing a relationship between the diameter and the vibration of the shaft.

Tests were made to two types of spindle motor using ceramic and stainless shafts, respectively, to obtain relationships between the shaft diameter and the vibrations (i.e., amplitude) of the vibrating shaft. The result is shown in FIG. 8. This clearly shows that the ceramic shafts, in particular with smaller diameter, are advantageous compared to the stainless shafts and well applicable to the hydrodynamic bearing assemblies.

Although the oil-lubricated bearing is employed for the hydrodynamic bearing, it may be replaced by the gas-lubricated bearing.

In conclusion, according to the present invention, simply by using the ceramic shaft, the vibration generated at the rotation of the shaft is decreased considerably. This allows not only the spindle motor but also the hard disc drive to be small-sized.

Also, due to the light-weight ceramic shaft, the bearing assembly mounted in the spindle motor is reduced.

Further, the number of hard discs to be carried on the ceramic shaft supported only at its one end is 1.5–2 times as many as the stainless shaft. This in turn means that the ceramic shaft supported only at its one end can carry almost the same number of hard discs as those supported by the stainless shaft supported at its opposite ends, which results in a further compact and simple spindle motor.

In particular, when the ratio of the outer diameter of the shaft to the outer diameter of the rotor hub is 0.4 or more, the rigidity of the shaft increases considerably, further reducing the vibration of the shaft. Also, the use of hydrodynamic bearing for the radial and axial bearings prevents possible torque increase and oil heating even if the ratio is 0.4 or more.

Furthermore, the ceramic shaft, if it is used in the hydrodynamic bearing, can be reduced in its diameter due to its high rigidity, reducing the peripheral speed of the shaft. This in turn means that the spindle motor can be driven at higher rotational speed.

Moreover, due to the high wear resistance of the ceramic, the wear caused in the shaft by its frictional contacts with other members can be reduced considerably, increasing the durability of the spindle motor.

What is claimed is:

1. A spindle motor, comprising
   a base member;
   an outer cylindrical member made from a hollow tube,
   an inner cylindrical member inserted in said outer cylindrical member so that one of said outer and inner cylindrical member is fixed to said base member and the other of said outer and inner cylindrical member is rotatable about a longitudinal axis thereof relative to said one of said outer and inner cylindrical member, said fixed cylindrical member being made of ceramic;
   a bearing assembly for bearing said rotatable cylindrical member on said fixed cylindrical member; and
   drive means for rotating said rotatable cylindrical member about said fixed cylindrical member,
      wherein said outer cylindrical portion has a cylindrical rotor hub for supporting one or more information storage media, and
      wherein a ratio of an outer diameter of said inner cylindrical member to an outer diameter of said cylindrical rotor hub is 0.4 or more.

2. A spindle motor in accordance with claim 1, wherein said hollow tube has an outer diameter of from 6 to 20 mm, and a difference between said outer diameter and an inner diameter is 4 mm or less.

3. A spindle motor in accordance with claim 1, wherein an outer diameter of said inner cylindrical member ranges from 1 to 2 mm, and said outer cylindrical portion has a cylindrical rotor hub for supporting 1–4 information storage media.

4. A spindle motor in accordance with claim 1, wherein an outer diameter of said inner cylindrical member is between 2 mm and about 20 mm, and said outer cylindrical portion has a cylindrical rotor hub for supporting between 4 and 20 information storage media.

* * * * *